Patented Sept. 6, 1938

2,129,197

UNITED STATES PATENT OFFICE 2,129,197

BRONZE ALLOY

John W. Bryant, Jr., Minneapolis, Minn.

No Drawing. Application July 3, 1937,
Serial No. 151,890

9 Claims. (Cl. 75—154)

This invention relates to bronze alloys. In particular, it relates to bronze alloys which can be welded onto steel or iron for use especially to form bearing surfaces and protective coatings therefor.

Most bronze alloys now available for use in producing welding rods are composed largely of copper and zinc with other elements added in small amounts for purposes of fluxing, etc. Due to the nature of the metals used in producing these welding rods, a welded surface made from them does not make a satisfactory bearing surface for many purposes. The high zinc content is undesirable in bearing surfaces for the reason that the zinc has an abrasive action. The degree of hardness, generally expressed in terms of "Brinell hardness" is low, generally running around 65. A hardness of 65 Brinell is in many situations insufficient to permit the metal to form a satisfactory bearing surface, especially where the bearing is required to carry a heavy load or is subjected to either corrosive or abrasive conditions. In many situations where great strength and rigidity are required, as on the shafts of rotary pumps, etc., high grade steel must be used to provide the requisite strength and rigidity. For bearing purposes, however, the steel is not satisfactory for various reasons among which are the inability of the steel to resist the corrosive action of the materials which would contact it and the lack of resistance of the steel to abrasive action. It, therefore, becomes desirable in many situations to coat steel with a material that will have the requisite qualities to form proper bearing surfaces for the steel, and at the same time will protect the steel against corrosive and abrasive action.

It is the general object of this invention to provide a novel bronze alloy having peculiar characteristics which adapt it for use in welding onto steel and cast iron, particularly for use to form bearing surfaces and protective coatings.

A more specific object is to provide such an alloy which is high in Brinell hardness and will form a fine bearing surface highly resistant to withstand abrasion and acid or corrosive conditions.

Another object is to provide a bronze alloy which can be formed into a welding rod for welding onto steel or iron and which is highly resistant to oxidation or burning in the welding flame.

Another object is to provide a novel bronze alloy having peculiar welding qualities which permits the same to be readily welded to iron or steel at rather low temperatures, and which alloy can be easily made to thoroughly bond with and, in fact, become an integral part of the body of metal to which it is welded.

Another object is to provide a novel process for producing my said alloy.

Still another object is to provide a novel alloy which is not subject to the disadvantages of present alloys now known and used for welding purposes onto steel and iron.

The objects and advantages of the invention will more fully appear from the following description.

I have found that a highly satisfactory alloy embodying my invention is produced when approximately the following proportions by weight of the following elements are employed:—

| | Percent |
|---|---|
| Copper | 80 |
| Tin | 17.3 |
| Nickel | 1.5 |
| Silicon | .5 |
| Iron | .5 |
| Phosphorus | .02 |
| Maximum impurities | .28 |

The above are the preferred proportions of the various ingredients that I use, but I have found that variance in the maximum and minimum proportions of the various elements may be made as follows:

| | Percent |
|---|---|
| Copper | 77 –92 |
| Tin | 8 –18 |
| Nickel | 1 – 5 |
| Silicon | .5 – 3 |
| Iron | .25– 1 |
| Phosphorus | 0 – .04 |
| Maximum impurities permitted | 0 – .30 |

If the proportions of copper are increased or decreased above or below 80% in the total mix, the proportions of tin conversely should be decreased or increased correspondingly. While the alloy can be formed without the use of phosphorus, it is highly desirable that from .02 to .04% phosphorus be used.

In preparing my bronze alloy, the iron and silicon used are first alloyed together in the proportions of 50% of each to form an alloy known as ferro-silicon. The nickel employed is alloyed with an equal amount by weight of copper to form the alloy known as nickel-copper. The phosphorus is alloyed with copper in the proportions of 10% by weight phosphorus to 90% by weight copper to form the alloy known as phosphor-copper.

The balance of the copper in pure form not employed in producing the nickel-copper alloy and the phosphor-copper alloy is charged with the nickel-copper and ferro-silicon. When the pure copper, nickel-copper and ferro-silicon have been melted, the tin is then added. The tin having a low melting point is quickly melted down. The phosphor-copper is added last after the tin has been added, to prevent the phosphorus from being burned out. After all the ingredients have been added, the molten metal is vigorously stirred with a steel rod having a high melting point to prevent any of the iron from the steel entering the mix. The molten metal is then poured into ingots, whereupon after the ingots have solidified they are melted down and the metal is then poured into molds to form welding rods of convenient size for welding purposes.

The welding rods so made are preferably, although not necessarily, coated with a standard commercial flux before they are used for welding purposes.

Assuming that it is desired to produce, for example, a shaft for a high pressure rotary pump, a shaft of high grade steel is first prepared in order to provide the requisite strength and rigidity. The steel alone is not satisfactory for bearing purposes for the reason that it lacks the ability to resist the corrosive action of the materials being pumped and it has little resistance to any abrasive action. It, therefore, becomes desirable to coat the steel shaft with material that will stand up under the conditions of use. The steel shaft is machined down to a size approximately one-fourth inch under that desired. The bronze alloy of the present invention in the form of welding rods is then used. A layer of the bronze alloy is applied to the shaft with a welding torch, whereupon the shaft is remachined to the desired size. This leaves a layer of the bronze alloy overlying the steel and securely attached to the steel shaft and forming an integral part thereof. If a machined section of the shaft is observed as through a glass, it will be seen that the outermost coating of the shaft is of a light copperish color and that this outer coating merges into an inner coating of grayish copperish color which, in turn, merges into the pure steel of gray color of the shaft.

The alloy welding rod is applied to the steel by use of an ordinary welding torch and as the rod is melted, it flows smoothly and quietly onto the steel without bubbling or agitation. This permits of even application of the alloy to the steel without bubbles or pits being formed in the final product. The phosphorus and silicon in the alloy serve to cause the metal to flow smoothly and quietly onto the steel without bubbling under the action of the welding torch. The phosphorus having remained in the alloy, at least, until acted upon by the welding torch acts as a flux and absorbs the oxygen and prevents the bubbling action. The silicon, of course, does the same thing to a certain degree. As the torch melts the welding rod, the iron in the alloy forms a protective film around the molten pool to prevent oxidization of the metal while at the same time the iron gives the alloy an affinity for the iron or steel to which the alloy is being welded. The tin and silicon give hardness to the applied alloy while the nickel gives toughness to the applied alloy, prevents brittleness of the same and most important of all it gives the applied alloy the property of elongation. The iron of course also adds some degree of hardness to the product. The phosphorus found in the welding rod, being employed as a flux during the operation of welding onto the steel or iron, is totally or almost totally consumed during the welding operation, its chief function being the absorption of oxygen when the rod and metal is in the welding flame. If any phosphorus remains in the final applied product, the small amount remaining does not change the physical characteristics of the final product and would be classified as an impurity therein. The final product therefore can be considered as containing practically no phosphorus.

The applied alloy has a Brinell hardness of 150 to 200 Br. It forms an almost perfect bearing surface because it is hard and it is able to withstand acid or corrosive conditions. As during its application it does not oxidize or burn in the welding flame, it is of uniform texture throughout without pits or bubbles therein and without irregularities of any kind. It bonds perfectly with steel or iron. One of the most important properties of the alloy is its elongation permitting stretch of the alloy with the backing metal even though the backing metal may have a different coefficient of linear expansion than the alloy. This elongation property prevents checking or cracking of the alloy on the backing metal as the backing metal is subjected to different temperatures.

The process of preparing the alloy of the invention is such as to prevent injury to the elements having low melting points as they are added. By first producing the respective alloys of ferro-silicon, nickel-copper and phosphor-copper, the smelting operation can be performed at a relatively low heat. By first forming the alloy into ingots and thereafter remelting the alloy and thereafter molding into the welding rods, a stabilized alloy is secured by uniformity of practice having advantages over an alloy that would be formed without employment of the ingoting and remelting steps.

The proportions of the various components of the alloy of the invention can be varied within the limits specified for various purposes to secure more pronounced or less pronounced characteristics attaching to the alloy in the final product. By reducing or increasing the proportions of tin and silicon, the hardness of the final product can be varied. By increasing or decreasing the proportion of nickel, the toughness and elongation of the final product can be varied.

While the alloy is particularly useful in producing bearing surfaces on iron or steel, it of course can be put to many other uses. In particular, it is contemplated that it may be used to form non-abrasive and non-corrosive liners or casings for iron and steel parts where strength is desired and yet the parts must not be susceptible to corrosion. By use of the present alloy, many parts now made entirely from bronze can be made from steel or iron to the exposed surfaces of which the alloy of the invention has been welded or otherwise applied.

It will, of course, be understood that variations may be made in the process of preparing my alloy and in the steps thereof and in the proportions of the various elements employed in the alloy without departure from the scope of the present invention which, generally stated, consists in the matter described and set forth in the appended claims.

What is claimed is:

1. A metal alloy consisting of the following proportions by weight of the following elements:

| | Per cent |
|---|---|
| Copper | 77 –92 |
| Tin | 8 –18 |
| Nickel | 1 – 5 |
| Silicon | .5 – 3 |
| Iron | .25– 1 |

2. A metal alloy consisting of the following percentages by weight of the following elements:

| | Per cent |
|---|---|
| Copper | 77 –92 |
| Tin | 8 –18 |
| Nickel | 1 – 5 |
| Silicon (approximately) | .5 |
| Iron (approximately) | .5 |

3. A metal alloy comprising the following percentages by weight of the following elements:

| | Per cent |
|---|---|
| Copper | 77 –92 |
| Tin | 8 –18 |
| Nickel (approximately) | 1.5 |
| Silicon (approximately) | .5 |
| Iron (approximately) | .5 |

4. A metal alloy consisting of approximately the following percentages by weight of the following elements:

| | Per cent |
|---|---|
| Copper | 80 |
| Tin | 17.3 |
| Nickel | 1.5 |
| Silicon | .5 |
| Iron | .5 |

5. A metal alloy consisting of the following percentages by weight of the following elements:

| | Per cent |
|---|---|
| Copper | 77 –92 |
| Tin | 8 –18 |
| Nickel | 1 – 5 |
| Silicon | .5– 3 |
| Iron (approximately) | .5 |

6. A metal alloy consisting of the following percentages by weight of the following elements:

| | Per cent |
|---|---|
| Copper | 77 –92 |
| Tin | 8 –18 |
| Nickel | 1 – 5 |
| Silicon (approximately) | .5 |
| Iron | .25– 1 |

7. A metal alloy consisting of the following percentages by weight of the following elements:

| | Per cent |
|---|---|
| Copper | 77 –92 |
| Tin | 8 –18 |
| Nickel (approximately) | 1.5 |
| Silicon | .5 – 3 |
| Iron | .25– 1 |

8. A metal alloy consisting of the following percentages by weight of the following elements:

| | Per cent |
|---|---|
| Copper | 77 –92 |
| Tin | 8 –18 |
| Nickel (approximately) | 1.5 |
| Silicon (approximately) | .5 |
| Iron | .25– 1 |

9. A metal alloy consisting of the following percentages by weight of the following elements:

| | Per cent |
|---|---|
| Copper | 77 –92 |
| Tin | 8 –18 |
| Nickel (approximately) | 1.5 |
| Silicon | .5– 3 |
| Iron (approximately) | .5 |

JOHN W. BRYANT, Jr.